United States Patent
Wu et al.

(10) Patent No.: US 11,647,417 B2
(45) Date of Patent: May 9, 2023

(54) METHOD, APPARATUS, COMPUTER PROGRAM PRODUCT AND COMPUTER PROGRAM

(71) Applicant: Nokia Technologies Oy, Espoo (FI)

(72) Inventors: Chunli Wu, Beijing (CN); Benoist Sebire, Tokyo (JP); Samuli Turtinen, Ii (FI)

(73) Assignee: Nokia Technologies Oy, Espoo (FI)

(*) Notice: Subject to any disclaimer, the term of this patent is extended or adjusted under 35 U.S.C. 154(b) by 32 days.

(21) Appl. No.: 16/758,263

(22) PCT Filed: Oct. 30, 2017

(86) PCT No.: PCT/CN2017/108410
§ 371 (c)(1),
(2) Date: Apr. 22, 2020

(87) PCT Pub. No.: WO2019/084730
PCT Pub. Date: May 9, 2019

(65) Prior Publication Data
US 2020/0344640 A1  Oct. 29, 2020

(51) Int. Cl.
*H04W 76/27* (2018.01)
*H04W 28/02* (2009.01)
*H04W 72/56* (2023.01)

(52) U.S. Cl.
CPC ....... *H04W 28/0278* (2013.01); *H04W 72/56* (2023.01)

(58) Field of Classification Search
None
See application file for complete search history.

(56) References Cited

U.S. PATENT DOCUMENTS 8,923,271 B2 * 12/2014 Wang ............... H04W 72/1242
                                                370/348
9,265,061 B2 *  2/2016 Yi ..................... H04W 28/0278
(Continued)

FOREIGN PATENT DOCUMENTS

CN    102291760 A    12/2011
CN    104144512 A    11/2014
(Continued)

OTHER PUBLICATIONS

"Flexible long BSR", LG Electronics Inc., 3GPP TSG-RAN WG2 Meeting #99bis, R2-1711723, Oct. 2017, 4 pgs.
(Continued)

*Primary Examiner* — Sithu Ko
(74) *Attorney, Agent, or Firm* — Harrington & Smith

(57) ABSTRACT

The disclosure relates to a method including determining that buffered data associated with a first sub-set of logical channel groups from a set of logical channel groups is available for transmission; generating a buffer status report, the buffer status report comprising information identifying the first sub-set of logical channel groups from a set of logical channel groups; and, associated with a second sub-set of logical channel groups, information identifying the amount of buffered data available for transmission, the second sub-set of logical channel groups being a proper sub-set of the first sub-set of logical channel groups; and transmitting the buffer status report.

18 Claims, 15 Drawing Sheets

(56) References Cited

U.S. PATENT DOCUMENTS

| | | | |
|---|---|---|---|
| 10,292,167 B2* | 5/2019 | Damnjanovic | ... H04W 28/0278 |
| 10,912,116 B2* | 2/2021 | Lou | ........................ H04W 72/04 |
| 10,932,154 B2* | 2/2021 | Tang | ........................ H04L 1/1614 |
| 11,102,807 B2* | 8/2021 | Shaheen | ................ H04W 76/27 |
| 11,272,568 B2* | 3/2022 | Shi | ........................ H04W 76/15 |
| 11,317,317 B2* | 4/2022 | Bergquist | .......... H04W 72/1284 |
| 11,516,700 B2* | 11/2022 | Kim | .................. H04W 74/0833 |
| 2013/0058220 A1* | 3/2013 | Yi | ..................... H04W 72/1284 |
| | | | 370/241 |
| 2013/0094455 A1* | 4/2013 | Wu | ........................ H04W 24/02 |
| | | | 370/328 |
| 2014/0126399 A1* | 5/2014 | Damnjanovic | ....... H04W 76/15 |
| | | | 370/252 |
| 2017/0006628 A1* | 1/2017 | Takahashi | ............. H04L 5/0064 |
| 2017/0048745 A1 | 2/2017 | Yi et al. | |
| 2018/0270698 A1* | 9/2018 | Babaei | ................. H04W 24/08 |
| 2019/0261408 A1* | 8/2019 | Lou | ................... H04W 72/1284 |
| 2019/0268799 A1* | 8/2019 | Hong | ..................... H04W 4/70 |
| 2020/0045577 A1* | 2/2020 | Yu | ..................... H04W 28/0252 |
| 2020/0120660 A1* | 4/2020 | Wang | ................ H04W 72/0446 |
| 2020/0275308 A1* | 8/2020 | Liu | ........................ H04L 1/1825 |

FOREIGN PATENT DOCUMENTS

| | | |
|---|---|---|
| CN | 105557014 A | 5/2016 |
| EP | 2584714 A2 | 4/2013 |
| JP | 2009165128 A | 7/2009 |
| WO | WO-2018/130968 A1 | 7/2018 |

OTHER PUBLICATIONS

"BSR enhancements", Intel Corporation, 3GPP TSG RAN WG2 Meeting #99bis, R2-I710606, Oct. 2017, 5 pgs.

"Truncated BSR Operation", Samsung, 3GPP TSG-RAN WG2#99 Meeting, R2-1709239, Aug. 2017, 3 pgs.

"BSR MAC CE Format", CATT, 3GPP TSG-RAN WG2 #99, R2-1707920, Aug. 2017, 3 pgs.

BSR formats in NR', Ericsson, 3GPP TSG-RAN WG2 #98-AH, R2-1707165, Jun. 2017, 3 pages.

* cited by examiner 300
304
303
302
301

METHOD, APPARATUS, COMPUTER PROGRAM PRODUCT AND COMPUTER PROGRAM

CROSS REFERENCE TO RELATED APPLICATION

This patent application is a U.S. National Stage application of International Patent Application Number PCT/CN2017/108410 filed Oct. 30, 2017, which is hereby incorporated by reference in its entirety.

FIELD OF THE INVENTION

The invention relates to a method, an apparatus, a computer program product and a computer program.

BACKGROUND

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or Wi-Fi). Wi-Fi is often used synonymously with WLAN. The wireless systems can be divided into cells, and are therefore often referred to as cellular systems.

A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. An example of standardized communication system architectures is the long-term evolution (LTE) of the Universal Mobile Telecommunications System (UMTS) radio-access technology. The LTE has been and is being standardized by the 3rd Generation Partnership Project (3GPP). The LTE employs the Evolved Universal Terrestrial Radio Access Network (E-UTRAN) access. Further development of LTE are sometimes referred to as LTE Advanced (LTE-A). The current 3GPP standardization effort is directed to what is termed as the 5th Generation (5G) system. The 5G system is sometimes referred to as NR (new radio).

One of the aspects of NR undergoing further study is reporting buffer status from the user equipment (UE) and the buffer status report (BSR) procedure. The Buffer Status reporting procedure is used to provide the serving access point (a base station or an eNodeB (eNB), or in a 5G system a Next Generation NodeB (gNB)) with the information about the amount of data available for transmission in the uplink (UL) buffers of the UE.

SUMMARY

There is provided, in a first aspect, a method comprising: determining that buffered data associated with a first sub-set of logical channel groups from a set of logical channel groups is available for transmission; generating a buffer status report, the buffer status report comprising: information identifying the first sub-set of logical channel groups from a set of logical channel groups; and, associated with a second sub-set of logical channel groups, information identifying the amount of buffered data available for transmission, the second sub-set of logical channel groups being a proper sub-set of the first sub-set of logical channel groups; and transmitting the buffer status report.

The method may further comprise determining a priority ordering of the set of logical channel groups based on at least one of: a determined logical channel group priority order; a determined logical channel group priority order based on a highest logical channel priority of a logical channel configured within the logical channel group; a determined logical channel group priority order based on a highest logical channel priority of a logical channel having data available for transmission within the logical channel group; a descending logical channel group identification value; an ascending logical channel group identification value; and a primary order level based on determined logical channel group priority order and a secondary order level based on the logical channel group identification value.

Generating the buffer status report may further comprises selecting logical channel groups from the first sub-set of logical channel groups based on the priority ordering of the set of logical channel groups to form the second sub-set.

Selecting logical channel groups from the first sub-set of logical channel groups based on the priority ordering of the set of logical channel groups to form the second sub-set may comprise selecting a determined number of elements from the first sub-set of logical channel groups based on the priority ordering of the set of logical channel groups, wherein the determined number may be based on a determined space available to an end of a packet data unit.

Transmitting the buffer status report may comprise transmitting the buffer status report at the end of the packet data unit, such that a receiver of the buffer status report is able to determine the number of logical channel groups within the second sub-set based on determining a length of the buffer status report from the start of the buffer status report to the end of the packet data unit and further determine the logical channel groups within the second sub-set based on the number of logical channel groups within the second sub-set.

Determining the logical channel groups within the second sub-set may be further based on the number of logical channel groups within the second sub-set, the information identifying the first sub-set and the priority ordering of the set of logical channel groups.

The buffer status report may comprise a report length value indicating the number of logical channel groups within the second sub-set of logical channel groups, such that a receiver of the buffer status report may be able to determine the number of logical channel groups within the second sub-set from the report length value and further determine the logical channel groups within the second sub-set based on the number of logical channel groups within the second sub-set.

Determining the logical channel groups within the second sub-set may be based on the number of logical channel groups within the second sub-set, the information identifying the first sub-set and the priority ordering of the set of logical channel groups.

Generating a buffer status report may comprise generating, for the information identifying the first sub-set of logical channel groups from a set of logical channel groups, a byte comprising a bitmap, wherein a value of a bit within the bitmap may identify whether a logical channel group from the set of logical channel groups is within the first sub-set and has buffered data associated with the logical channel group available for transmission.

Generating a buffer status report may further comprise one of: generating for each logical channel group within the second sub-set of logical channel groups a byte comprising a buffer status value identifying the amount of data available for transmission associated with the logical channel group within the second sub-set of logical channel groups; and generating for each logical channel group within the second sub-set of logical channel groups a byte comprising a logical channel group identifier for identifying the logical channel group and a buffer status value identifying the amount of data available for transmission associated with the logical channel group within the second sub-set of logical channel groups.

According to a second aspect there is provided a method comprising: receiving a buffer status report, the buffer status report comprising: information identifying a first sub-set of logical channel groups from a set of logical channel groups, the first sub-set of logical channel groups comprising logical channel groups with buffered data available for reception; and associated with a second sub-set of logical channel groups information identifying the amount of buffered data available for reception, the second sub-set of logical channel groups being a proper sub-set of the first sub-set of logical channel groups; extracting for any logical channel groups within the second sub-set of logical channel groups the amount of buffered data available for reception; identifying at least one further logical channel group which is an element of an intersection the first sub-set of logical elements and a compliment of the second sub-set of logical channel groups for which a non-zero amount of data is available for reception and an amount of buffered data is not defined; and performing at least one network control function based on at least one of the extracting and identifying.

The method may further comprise determining a priority ordering of the set of logical channel groups based on at least one of: a determined logical channel group priority order; a determined logical channel group priority order based on a highest logical channel priority of a logical channel configured within the logical channel group; a determined logical channel group priority order based on a highest logical channel priority of a logical channel having data available for transmission within the logical channel group; a descending logical channel group identification value; an ascending logical channel group identification value; and a primary order level based on determined logical channel group priority order and a secondary order level based on the logical channel group identification value.

Extracting for any logical channel groups within the second sub-set of logical channel groups the amount of buffered data available for reception may comprise associating the information identifying the amount of buffered data available for reception to each of the second sub-set of logical channels based on the priority ordering of the set of logical channel groups.

Receiving a buffer status report may comprise receiving the buffer status report at an end of a packet data unit, and associating the information identifying the amount of buffered data available for reception to each of the second sub-set of logical channels based on the priority ordering of the set of logical channel groups may comprise: determining a length of the buffer status report based on a start of the buffer status report to the end of the packet data unit; and determining logical channel groups within the second sub-set based on the length of the buffer status report.

Determining logical channel groups within the second sub-set may be based on the length of the buffer status report, the information identifying the first sub-set and the priority ordering of the set of logical channel groups.

Associating the information identifying the amount of buffered data available for reception to each of the second sub-set of logical channels based on the priority ordering of the set of logical channel groups may comprise: receiving within the buffer status report a report length value indicating a number of logical channel groups within the second sub-set of logical channel groups; and determining the logical channel groups within the second sub-set based on the number of logical channel groups within the second sub-set, the information identifying the first sub-set and the priority ordering of the set of logical channel groups.

The second sub-set may be an empty set.

The end of the packet data unit may be a last medium access control control element multiplexed in an uplink medium access control packet data unit.

The buffer status report may be a new radio long truncated buffer status report.

According to a third aspect there is provided an apparatus comprising at least one processor and at least one memory including a computer program code, the at least one memory and the computer program code configured to, with the at least one processor, cause the apparatus at least to: determine that buffered data associated with a first sub-set of logical channel groups from a set of logical channel groups is available for transmission; generate a buffer status report, the buffer status report comprising: information identifying the first sub-set of logical channel groups from a set of logical channel groups; and, associated with a second sub-set of logical channel groups, information identifying the amount of buffered data available for transmission, the second sub-set of logical channel groups being a proper sub-set of the first sub-set of logical channel groups; and transmit the buffer status report.

The at least one processor may be further caused to determine a priority ordering of the set of logical channel groups based on at least one of: a determined logical channel group priority order; a determined logical channel group priority order based on a highest logical channel priority of a logical channel configured within the logical channel group; a determined logical channel group priority order based on a highest logical channel priority of a logical channel having data available for transmission within the logical channel group; a descending logical channel group identification value; an ascending logical channel group identification value; and a primary order level based on determined logical channel group priority order and a secondary order level based on the logical channel group identification value.

The at least one processor caused to generate the buffer status report may be further caused to select logical channel groups from the first sub-set of logical channel groups based on the priority ordering of the set of logical channel groups to form the second sub-set.

The at least one processor caused to select logical channel groups from the first sub-set of logical channel groups based on the priority ordering of the set of logical channel groups to form the second sub-set may be further caused to select a determined number of elements from the first sub-set of logical channel groups based on the priority ordering of the set of logical channel groups, wherein the determined number may be based on a determined space available to an end of a packet data unit.

The at least one processor caused to transmit the buffer status report is further caused to transmit the buffer status report at the end of the packet data unit, such that at least one further apparatus configured to receive the buffer status report may be able to determine the number of logical channel groups within the second sub-set based on determining a length of the buffer status report from the start of the buffer status report to the end of the packet data unit and further determine the logical channel groups within the second sub-set based on the number of logical channel groups within the second sub-set.

The receiver may further determine the logical channel groups within the second sub-set based on the number of logical channel groups within the second sub-set, the information identifying the first sub-set and the priority ordering of the set of logical channel groups.

The buffer status report may comprise a report length value indicating the number of logical channel groups within the second sub-set of logical channel groups, such that at least one further apparatus configured to receive the buffer status report may be able to determine the number of logical channel groups within the second sub-set from the report length value and further determine the logical channel groups within the second sub-set based on the number of logical channel groups within the second sub-set.

The receiver may further determine the logical channel groups within the second sub-set based on the number of logical channel groups within the second sub-set, the information identifying the first sub-set and the priority ordering of the set of logical channel groups.

The at least one processor caused to generate a buffer status report may be further caused to generate, for the information identifying the first sub-set of logical channel groups from a set of logical channel groups, a byte comprising a bitmap, wherein a value of a bit within the bitmap may identify whether a logical channel group from the set of logical channel groups is within the first sub-set and has buffered data associated with the logical channel group available for transmission.

The at least one processor caused to generate a buffer status report may be further caused to generate one of: for each logical channel group within the second sub-set of logical channel groups a byte comprising a buffer status value identifying the amount of data available for transmission associated with the logical channel group within the second sub-set of logical channel groups; and for each logical channel group within the second sub-set of logical channel groups a byte comprising a logical channel group identifier for identifying the logical channel group and a buffer status value identifying the amount of data available for transmission associated with the logical channel group within the second sub-set of logical channel groups.

According to a fifth aspect there is provided an apparatus comprising at least one processor and at least one memory including a computer program code, the at least one memory and the computer program code configured to, with the at least one processor, cause the apparatus at least to: receive a buffer status report, the buffer status report comprising: information identifying a first sub-set of logical channel groups from a set of logical channel groups, the first sub-set of logical channel groups comprising logical channel groups with buffered data available for reception; and associated with a second sub-set of logical channel groups information identifying the amount of buffered data available for reception, the second sub-set of logical channel groups being a proper sub-set of the first sub-set of logical channel groups; extract for any logical channel groups within the second sub-set of logical channel groups the amount of buffered data available for reception; identify at least one further logical channel group which is an element of an intersection the first sub-set of logical elements and a compliment of the second sub-set of logical channel groups for which a non-zero amount of data is available for reception and an amount of buffered data is not defined; and perform at least one network control function based on at least one of the extracting and identifying.

The at least one processor may be further caused to determine a priority ordering of the set of logical channel groups based on at least one of: a determined logical channel group priority order; a determined logical channel group priority order based on a highest logical channel priority of a logical channel configured within the logical channel group; a determined logical channel group priority order based on a highest logical channel priority of a logical channel having data available for transmission within the logical channel group; a descending logical channel group identification value; an ascending logical channel group identification value; and a primary order level based on determined logical channel group priority order and a secondary order level based on the logical channel group identification value.

The at least one processor caused to extract for any logical channel groups within the second sub-set of logical channel groups the amount of buffered data available for reception may be further caused to associate the information identifying the amount of buffered data available for reception to each of the second sub-set of logical channels based on the priority ordering of the set of logical channel groups.

The at least one processor caused to receive a buffer status report may be further caused to receive the buffer status report at an end of a packet data unit, and the at least one processor caused to associate the information identifying the amount of buffered data available for reception to each of the second sub-set of logical channels based on the priority ordering of the set of logical channel groups may be further caused to: determine a length of the buffer status report based on a start of the buffer status report to the end of the packet data unit; and determine logical channel groups within the second sub-set based on the length of the buffer status report.

The at least one processor may be caused to determine logical channel groups within the second sub-set based on the length of the buffer status report, the information identifying the first sub-set and the priority ordering of the set of logical channel groups.

The at least one processor caused to associate the information identifying the amount of buffered data available for reception to each of the second sub-set of logical channels based on the priority ordering of the set of logical channel groups may be further caused to: receive within the buffer status report a report length value indicating a number of logical channel groups within the second sub-set of logical channel groups; and determine the logical channel groups within the second sub-set based on the number of logical channel groups within the second sub-set.

The at least one processor may be caused to determine logical channel groups within the second sub-set based on the number of logical channel groups within the second sub-set of logical channel groups, the information identifying the first sub-set and the priority ordering of the set of logical channel groups.

The second sub-set may be an empty set.

The end of the packet data unit may be a last medium access control control element multiplexed in an uplink medium access control packet data unit.

The buffer status report may be a new radio long truncated buffer status report.

The apparatus may be a user equipment.

The apparatus may be gNode B.

A computer program product for a computer, comprising software code portions for performing the steps of the method as described herein when said product is run on the computer.

A computer program embodied on a non-transitory computer-readable storage medium, the computer program comprising program code for controlling a process to execute a process, the process comprising the steps of the method as discussed herein.

There is provided, in further aspects, an apparatus comprising: means for performing the method operations discussed herein.

BRIEF DESCRIPTION OF THE DRAWING

Some embodiments will now be described in further detail, by way of example only, with reference to the following examples and accompanying drawings, in which.

DETAILED DESCRIPTION OF THE DRAWINGS

Before explaining in detail embodiments, certain general principles of a communication system, a mobile communication device and a control apparatus are briefly explained with reference to FIGS. 1 to 3 to assist in understanding the technology underlying the described invention.

Figure 1:
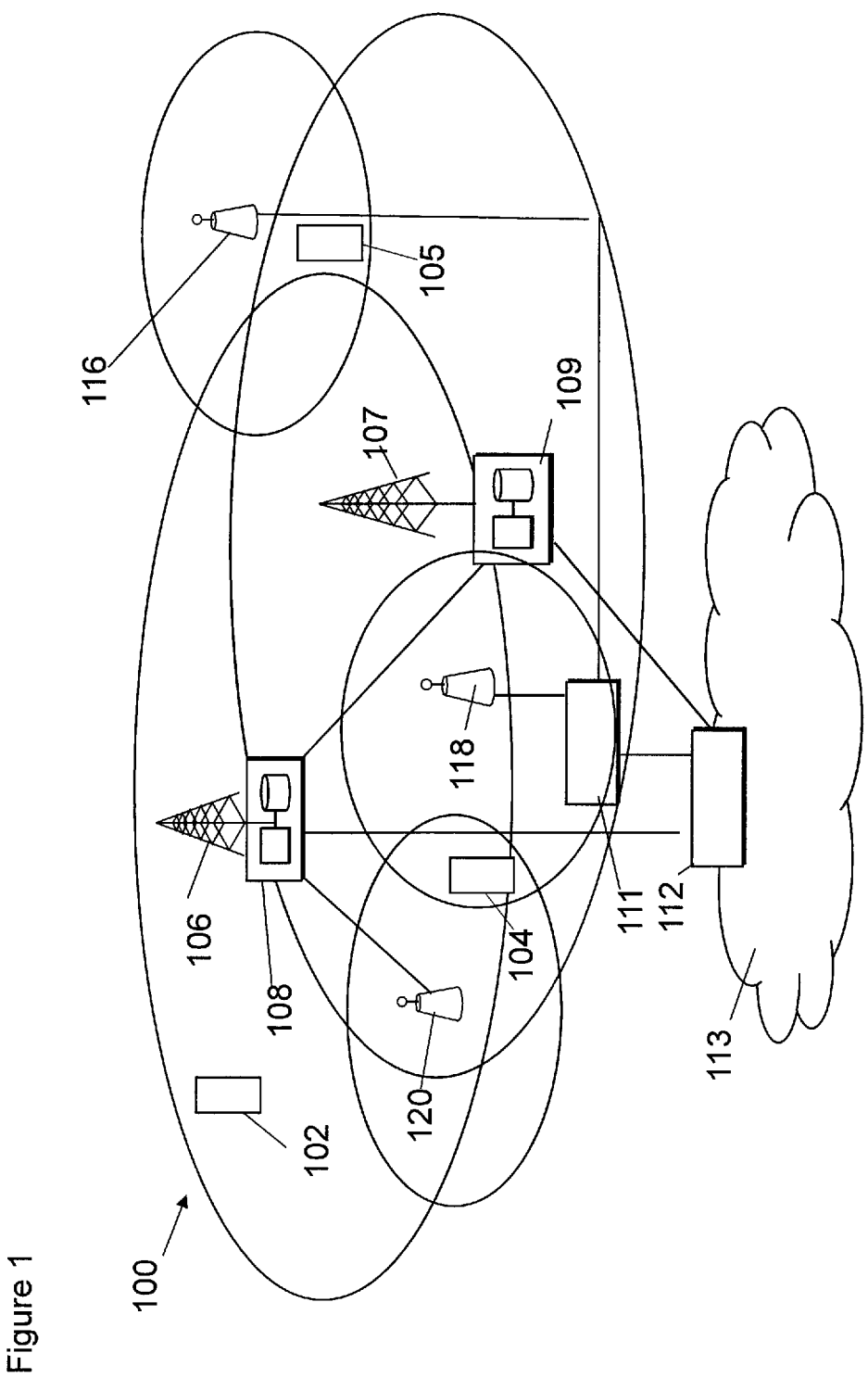
FIG. 1 schematically shows a communication system within which embodiments may be employed.

In a wireless communication system 100, such as that shown in FIG. 1, wireless communication devices, for example, user equipments 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
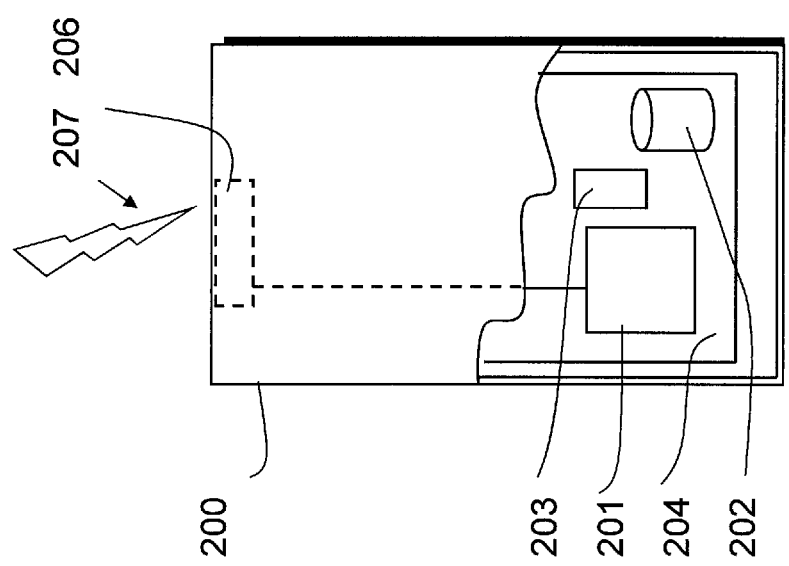
FIG. 2 schematically shows a communication device within which embodiments may be employed.

A possible wireless communication device will now be described in more detail with reference to FIG. 2 showing a schematic, partially sectioned view of a communication device 200. Such a communication device is often referred to as an endpoint device. An appropriate communication device may be provided by any device capable of sending and receiving radio signals.

A communication device may be for example a mobile device, that is, a device not fixed to a particular location, or it may be a stationary device. The communication device may need human interaction for communication, or may not need human interaction for communication.

The communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A communication device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. Furthermore, a wireless communication device may comprise appropriate connectors (either wired or wireless) to other devices and/or for connecting external accessories. The communication devices 102, 104, 105 may access the communication system based on various access techniques.

Figure 3:
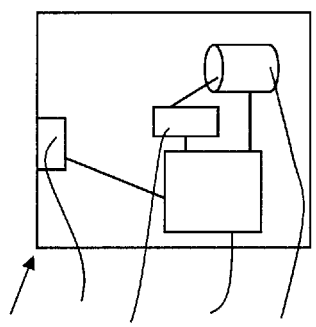
FIG. 3 schematically shows a control apparatus within which embodiments may be employed.

FIG. 3 shows an example of a control apparatus 300. The control apparatus may be integrated in a gNB. The control apparatus 300 can be arranged to provide control on communications in a service area of the system. The control apparatus 300 comprises at least one memory 301, at least one data processing unit 302, 303 and an input/output interface 304. Via the interface the control apparatus 300 can be coupled to a receiver and a transmitter of the gNB. The receiver and/or the transmitter may be implemented as a radio front end or a remote radio head. For example the control apparatus 300 can be configured to execute an appropriate software code to provide the control functions.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced NodeBs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a communications system is the 5G concept. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Figure 6:
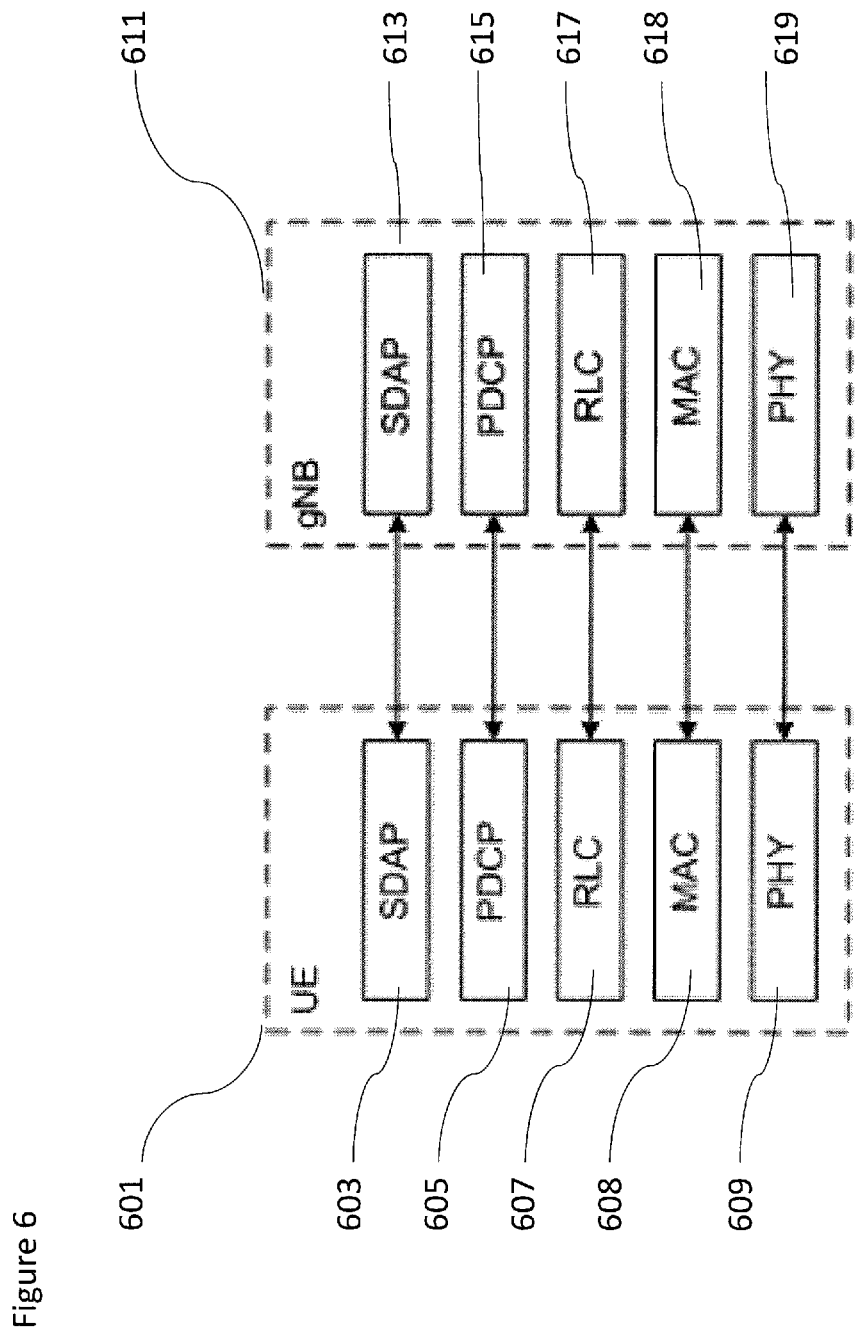
FIG. 6 illustrates a protocol stack for 5G NR.

FIG. 6 illustrates the 5G NR Radio protocol stack (user plane), such as defined in 3GPP TS 38.300. The protocol stack is shown between a UE 601 and gNB 611. The protocol stack comprises a physical layer (PHY) 609, 619, a medium access layer (MAC) 608, 618, a radio link control layer (RLC) 607, 617, featuring radio resource control (RRC), Packet Data Convergence Control layer (PDCP) 605, 615 and a service data adaptation protocol layer (SDAP) 603, 613.

The functions of the SDAP 603, 613 include mapping between a quality of service (QoS) flow and a data radio bearer and marking QoS flow ID (QFI) in both DL and UL packets. A single SDAP is configured for each individual PDU session, except for dual connectivity (DC) where two SDAP entities can be configured.

The functions of the PDCP 605, 615 sublayer include sequence numbering, header compression and decompression, transfer of user data, reordering and duplicate detection, PDCP packet data units (PDU) routing, retransmission of PDCP service data units (SDU), ciphering and deciphering, PDCP SDU discard, PDCP re-establishment and data recovery for RLC acknowledge mode (AM), duplication of PDCP PDUs.

The functions of the RLC layer 607, 617 depend on the transmission mode and include transfer of upper layer PDUs, sequence numbering independent of the one in PDCP, error correction through automatic repeat request (ARQ), segmentation and re-segmentation, reassembly of RL SDU, RLC SDU discard, RLC re-establishment.

The functions of the MAC layer 608, 618 include mapping between logical channels and transport channels, multiplexing/demultiplexing of MAC SDUs belonging to one or different logical channels into/from transport blocks (TB) delivered to/from the physical layer on transport channels, scheduling information reporting, error correction through hybrid ARQ, (HARQ), priority handling between UEs by means of dynamic scheduling, priority handling between logical channels of one UE by means of logical channel prioritization, padding. A single MAC entity can support one or multiple numerologies and/or TTI durations and mapping restrictions in logical channel prioritization controls which numerology and/or TTI duration a logical channel can use.

The functions of the physical Layer 609, 619 includes carrying all information from transport channels over physical channels. It takes care of link adaptation (AMC), power control, cell search (for initial synchronization and handover purposes) and other measurements for the RRC layer.

Some embodiments relate to buffer status report procedures in 5G NR but it will be understood that they are equally applicable to other radio access technologies.

As discussed previously the buffer status report (BSR) and reporting procedure is used to provide the serving eNB and gNB with the information about the amount of data available for transmission in the uplink (UL) buffers of the UE.

There are three types of BSRs; Regular BSR, Periodic BSR, and Padding BSR.

RRC parameters which control BSR reporting include the two timers periodic BSR-Timer and retxBSR-Timer and optionally allocates a logical channel group (LCG) to each logical channel. A logical channel group is signalled under LogicalChannelConfig of each radio bearer (RB). The mapping of a RB (or logical channel) to a LCG is done at the time when RB is setup by the gNB. A buffer status report (BSR) can be triggered if any of the following events occur:

When UL data, for a logical channel which belongs to a LCG, becomes available for transmission in the RLC entity or in the PDCP entity and there is no data available for transmission for any of the logical channels which belong to any LCG (This is called as Regular BSR);

When UL data, for a logical channel which belongs to a LCG, becomes available for transmission in the RLC entity or in the PDCP entity and the data belongs to a logical channel with higher priority than the priorities of the logical channels whose buffers are not empty (This is also called as Regular BSR);

the retxBSR-Timer expires and the UE has data available for transmission for any of the logical channels which belong to a LCG (Even this is also called as Regular BSR);

UE has UL resources allocated and number of padding bits is equal to or larger than the size of the BSR MAC CE+its subheader (This is referred to as Padding BSR);

When periodicBSR-Timer expires, the triggered BSR is called as Periodic BSR;

The retxBSR-Timer improves the robustness of UE's buffer status reporting behaviour and avoids a deadlock situation such as the case where the UE has transmitted a BSR but never received an uplink grant. This could be for example; gNB has erroneously decoded data on PUSCH and transmitted NACK but UE detected NACK as ACK.

The UE starts/restarts retxBSR-Timer upon indication of a grant for transmission of new data on UL-SCH. Upon the expiry of this timer, regular BSR is triggered. This timer is configured by RRC and can vary from 320 ms till 10.24 seconds.

The periodicBSR-Timer triggers a Periodic BSR. A Periodic BSR is used to provide the gNB with the updated buffer status report. Unlike the retxBSR-Timer, the periodicBSR-Timer is optional and can be set to Infinity to disable this timer. Its value may vary from 5 ms to 2.56 seconds.

BSR is UEs MAC procedure and the BSR is sent as a Buffer Status Report MAC Control Element.

In the recent RAN2 #99 meeting, the following details of NR BSR concept have been agreed:

There may be the 3 types of BSRs including Regular BSR, Periodic BSR and Padding BSR;

A Short BSR format of one byte is supported. Also a Truncated BSR format of 1 byte (i.e. Short Truncated BSR) is supported. However the details of this format as for further study;

The buffer status (BS) size and table are similarly for further study;

A Flexible Long BSR format will be supported. The number of LCGs to report is decided before the PDU is constructed. BS information is the BS status after LCP. BS of 0 for some LCG can be reported; and BSR cancelation is for further study.

In the recent RAN2 #99bis meeting, the following details of NR BSR concept were also agreed:

For the agreed short BSR format 5 bits are to be used to represent buffer status values;

For the agreed long BSR format 8 bits are to be used to represent buffer status values;

A Variable-size BSR MAC CE with a bitmap indicating the reported LCGs was agreed. This defines a one byte bitmap to be used and buffer size of indicated-only LCG (s) are provided according to an increasing LCG order. LCGs with no data in the buffer before LCP do not have to be reported;

As a baseline, a short BSR is reported when a single LCG has data available;

A truncated BSR can use the short BSR or long BSR format. The truncated short BSR is used when only 2 byte of padding are available and long truncated BSR is used when more than 2 bytes of padding are available;

For truncated BSR the LCGs are selected based highest order of priority;

4 LCID(s) are used to indicate short BSR, long BSR, short truncated BSR, and long truncated BSR.

Figure 4:
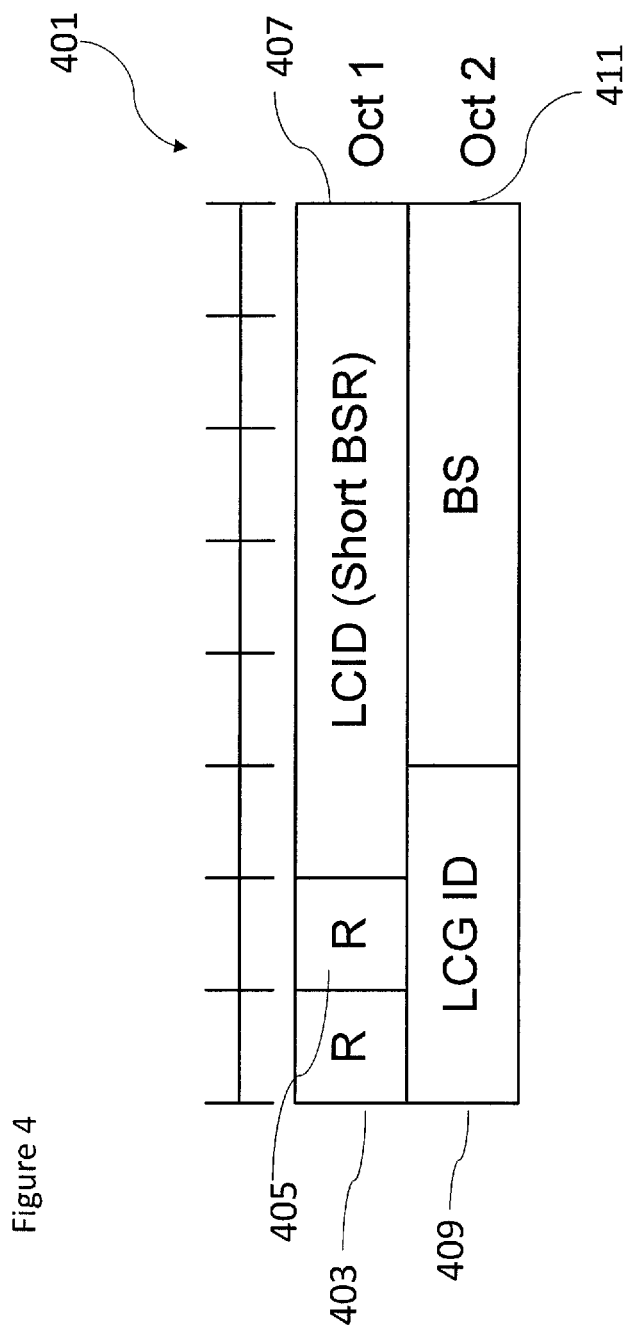
FIG. 4 schematically shows a known new radio short buffer status reporting format.

With respect to FIG. 4 an example short BSR format is shown such as agreed in RAN2 #99bis. The short BSR 401 comprises a first byte and second byte. The first byte (Oct1) comprises two reserved bits 403 and 405 and the LCID value 407 identifying the BSR as being a short BSR format message. An example LCID value 407 identifying the BSR type may be 111011-Short Truncated BSR, 111100-Long Truncated BSR, 111101-Short BSR, and 111110-Long BSR. However any suitable value or values may be used. The second byte (Oct2) comprises a LCG ID value (3 bits) 409 and associated buffer status value (5 bits) 411 representing the buffer level.

Figure 5:
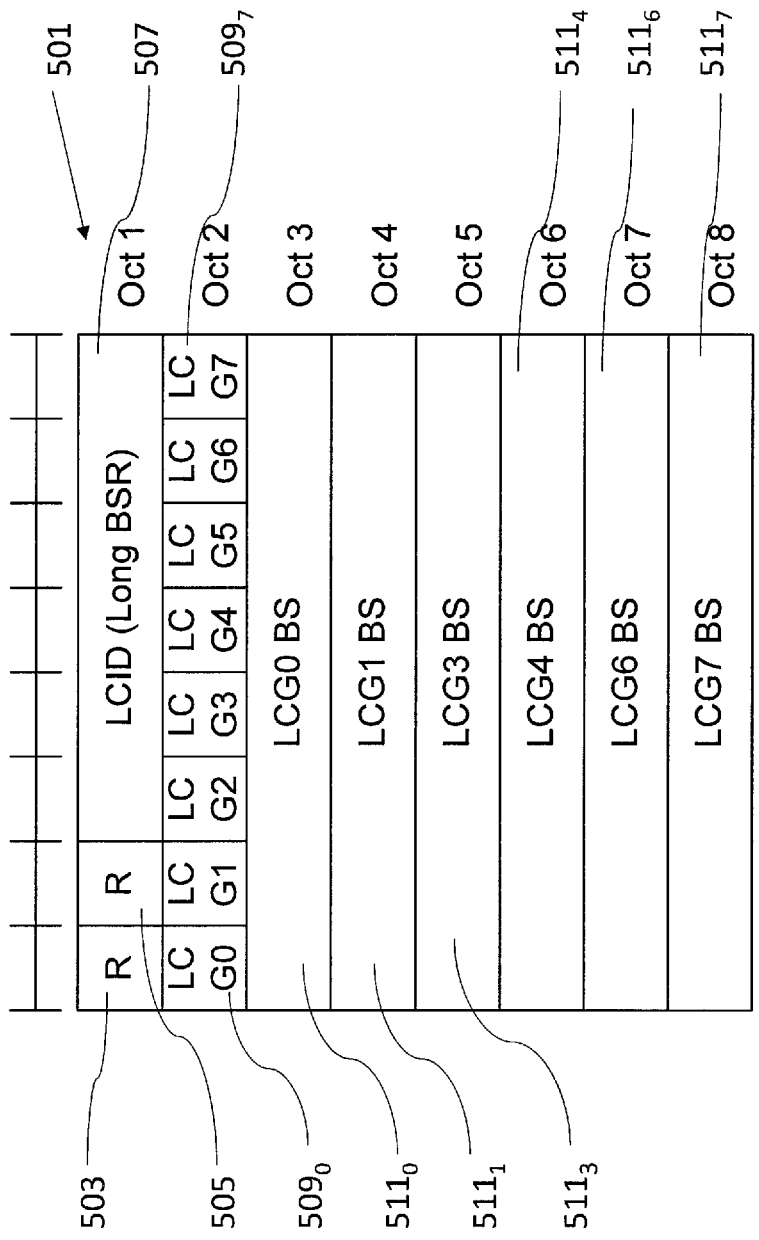
FIG. 5 schematically shows a known new radio flexible long buffer status reporting format.

With respect to FIG. 5 an example flexible long BSR format is shown such as agreed in RAN2 #99bis. The flexible long BSR 501 comprises a number of bytes. The first byte (Oct1) comprises two reserved bits 503 and 505 and the LCID value 507 identifying the BSR as being a flexible long BSR format message. The second byte (Oct2) comprises a bitmap (series of LCG ID bits $509_0$ to $509_7$) identifying which of the LCG 0 to 7 buffer status values are reported. The further bytes 511 comprise buffer status values (8 bits) representing the buffer level indicated in bitmap 509 (comprising bits $509_0$ to $509_7$). Thus as shown in FIG. 5 there are reported bytes (Oct3) $511_0$ a buffer status value representing the buffer level for LCG 0, (Oct4) $511_1$ a buffer status value representing the buffer level for LCG 1, (Oct5) $511_3$ a buffer status value representing the buffer level for LCG 3, (Oct6) $511_4$ a buffer status value representing the buffer level for LCG 4, (Oct7) $511_6$ a buffer status value representing the buffer level for LCG 6, and (Oct8) $511_7$ a buffer status value representing the buffer level for LCG 7. In such an example an expected binary value for the bitmap 509 in the second byte (Oct2) would be 11011011. In other words LCG ID bit $509_0$ being 1, LCG ID bit $509_1$ being 1, LCG ID bit $509_2$ being 0, LCG ID bit $509_3$ being 1, LCG ID bit $509_4$ being 1, LCG ID bit $509_5$ being 0, LCG ID bit $509_6$ being 1 and LCG ID bit $509_7$ being 1.

As can be seen in FIG. 5, the NR long BSR format could indicate the number of LCGs having data flexibly not requiring to report LCGs not having any data when the BSR was to be constructed (and BS being zero).

As per the RAN2 agreements the truncated BSR can use short BSR or long BSR format. Furthermore it has been agreed that the truncated BSR can indicate more than one BS for LCGs but not all LCGs having data where the number of padding bits does not allow to report a full long BSR, i.e., every LCG having data.

LTE principle to report truncated/short/long BSR format for a padding BSR is given below based on 3GPP TS 36.321:

For a padding BSR:
if the number of padding bits is equal to or larger than the size of the short BSR plus its subheader but smaller than the size of the long BSR plus its subheader:

if more than one LCG has data available for transmission in the transmission time interval (TTI) where the BSR is transmitted: report truncated BSR of the LCG with the highest priority logical channel with data available for transmission;

else report short BSR.

else if the number of padding bits is equal to or larger than the size of the long BSR plus its subheader, report long BSR.

In LTE, truncated BSR uses one byte short BSR format with only one LCG reported and corresponding LCG ID included. To make long truncated BSR to follow along the same lines for NR, it works if the bitmap in the second byte only indicates the LCGs which BS is reported in this BSR report, i.e., not all LCGs having data.

This however has led to the potential issue in that it is not clear which LCGs to include if the LCHs if the LCGs have same priority. This is more likely to occur in NR than LTE given that in NR logical channel restrictions can be configured for logical channels. For example numerology/TTI length restriction based on services supported (eMBB vs. URLLC). Furthermore it may be possible to have equal LCH priorities in multiple LCGs, as well as LCHs with same priority for a duplicated data radio bearer (DRB) to be configured into different LCGs. Based on the LTE principle of selecting the LCG to report based on priority of the LCH in the group, there would be ambiguity for the UE how to select the LCG to report in truncated BSR and for the gNB to know which LCGs are reported for the case of LCHs in LCGs have same priority. This issue has not been addressed in LTE and it is handled on a UE specific implementation basis.

Furthermore, depending on how the UE reports, a gNB may not get information of a LCG having data which could contain LCHs of certain service that could be restricted to be mapped to certain UL grant type(s).

The concept as discussed in further detail hereafter is one where the UE is configured to provide the gNB with more information in the Long truncated BSR format. Thus in some embodiments it is proposed the bitmap in the BSR format indicates (for example where the bit is set to a "1" value) all LCGs having data in the UE buffer even if for only part of those LCGs an actual BS can be included in the report.

Furthermore in such embodiments it is configured that the Long truncated BSR is defined by the UE to be the last MAC CE multiplexed in the UL MAC PDU. Since the long truncated BSR is located as the last subPDU in the MAC PDU, the receiving gNB can implicitly (based on the remaining size of the MAC PDU) determine the size of the MAC CE and therefore how many LCGs actual BS are reported in the Long truncated BSR even though all the LCGs having data were reported in the bitmap. By implementing the long truncated BSR as the last subPDU the method avoids having to specify the actual number of reported LCGs as the number of actually reported BSs is derived implicitly by the gNB based on the remaining MAC PDU size for the MAC CE. In such embodiments we can provide the network (NW) with more information in the BSR compared to the known implementations where the LCG IDs which are actually reported are indicated (for example with value "1") in the bitmap.

As more information can be actually reported to the NW than with the known methods as shown in FIGS. 4 and 5 as the NW, for example the gNB is able to determine all the LCGs which have data in the UE buffer to report on top of the LCGs which have their buffer status explicitly reported (due to their higher priority). As the NW gets information of all LCGs having data (in other words not just the explicitly reported LCGs) available in the UE, the NW can be configured to perform control operations based on this additional information even though the control entity does not know the exact buffer status of the other non-reported LCGs.

For instance, a logical channel group (LCG) may include logical channel or channels (LCH) data that can be mapped only to certain type of UL grant given that there are possibility to configure LCH mapping restrictions in the 5G/NR network to the UE. By only knowing the logical channel group identifier (LCG ID) having data, a NW control entity may be configured to determine a certain UL grant type needs to be provided to the UE so that data of LCH(s) of that LCG will get mapped to a MAC PDU.

In some embodiments in order to overcome the ambiguity of which LCG Ds the actual BS values are reported a series of priority determinations are proposed.

According to a first set of embodiments a LCG priority is introduced for the purpose of truncated BSR. In such embodiments the UE is configured to always report the highest priority LCG(s) which have data buffered in descending order of priority. In some of these embodiments furthermore a LCG priority could also be determined based on the highest priority LCH belonging to the LCG. The priority of LCHs is known to both UE and gNB and furthermore which LCHs are mapped to which LCG is also known to both UE and gNB.

Figure 7:
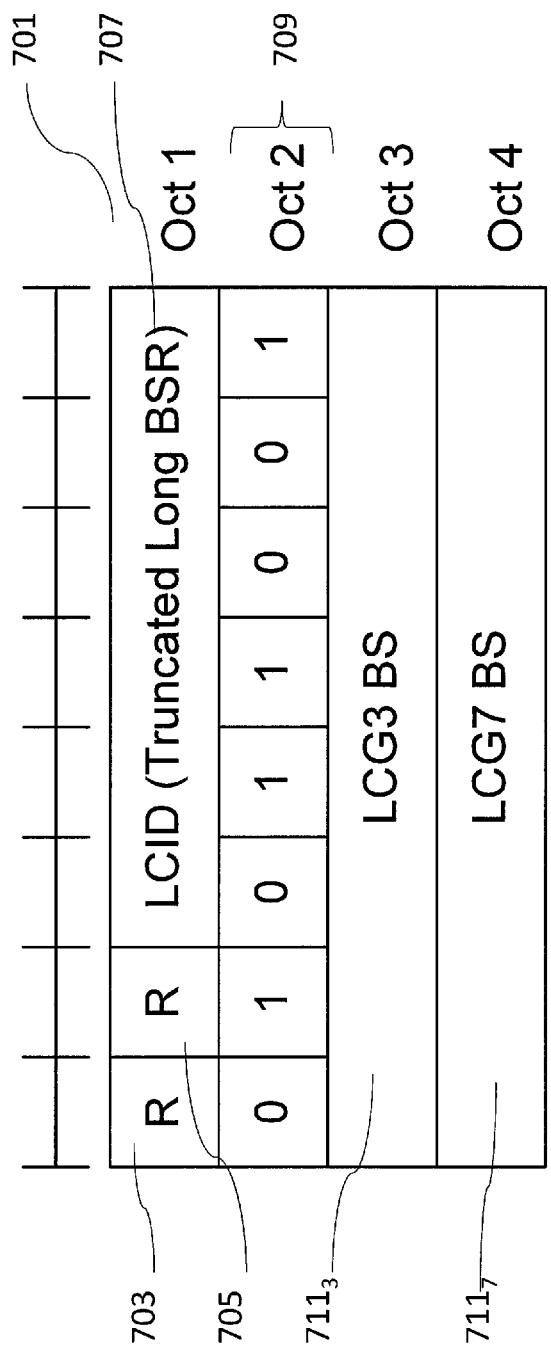
FIGS. 7 to 10 schematically show examples of new radio long truncated buffer status reporting formats according to some embodiments.

For example FIG. 7 shows an example long truncated buffer status report format according to the priority definition in the first set of embodiments. The long truncated buffer status report 701 is shown with a first byte (Oct1) comprising a pair of reserved bits 703, 705 and the LCID value 707 identifying the report as a long truncated buffer status report. The long truncated buffer status report 701 is shown with a second byte (Oct2) which comprises the bitmap (or a series of bits) 709 identifying which logical channel groups have data buffered.

The remaining bytes can then be used to select, based on LCG priorities, the number of LCGs buffer status values to report. Thus for example as indicated by the bitmap 709 there is data stored in buffers LCG1, LCG3, LCG4, and LCG7. If in this example the LCG priority order is LCG3, LCG7, LCG4, LCG1, the selected LCGs to report are LCG3 and LCG7. This is shown in FIG. 7 by the third byte (Oct3) which comprises the LCG3 buffer status value $711_3$ and the fourth byte (Oct4) which comprises the LCG7 buffer status value $711_7$.

Thus in the example shown in FIG. 7 it is shown that the logical channel groups LCG1, LCG3, LCG4 and LCG7 all have data buffered but based on the LCG priorities (or highest priority LCH in the LCG) only LCGs 3 and 7 are actually reported. However, the gNB is able to determine that there is also data in the LCG1 and LCG4 despite the actual values not being reported.

According to a second set of embodiments a priority of LCGs to report is determined by selecting a first X LCG IDs in ascending/descending order having data in the bitmap are selected to be reported. In this embodiment the value X is the number of LCGs which BS is possible to be reported in the long truncated BSR.

Figure 8:
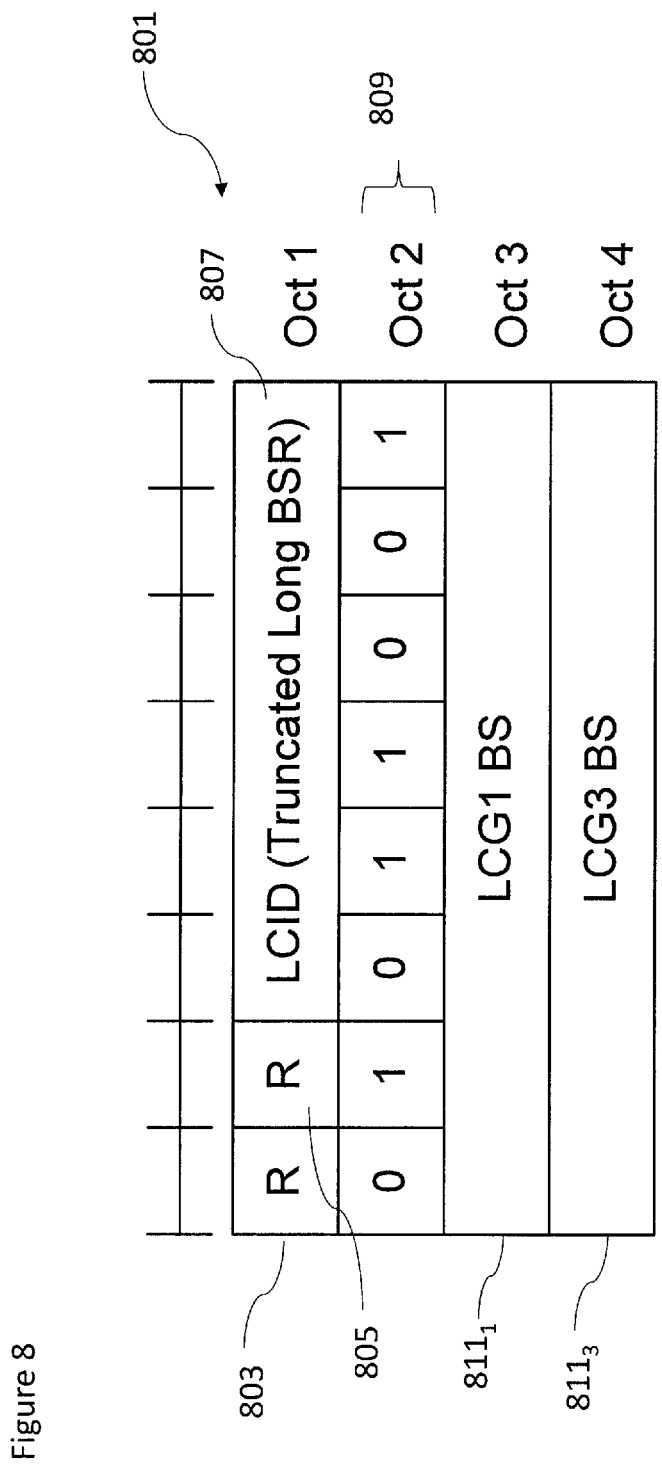

For example FIG. 8 shows an example long truncated buffer status report format according to the priority definition in the second set of embodiments. The long truncated buffer status report 801 is shown with a first byte (Oct1) comprising a pair of reserved bits 803, 805 and the LCID value 807 identifying the report as a long truncated buffer status report. The long truncated buffer status report 801 is also shown with a second byte (Oct2) which comprises a bitmap (or series of bits) 809 identifying which logical channel groups have data buffered.

The remaining bytes are used to select, based on LCG ID descending order, the number X (where X=2 in FIG. 8) of LCGs buffer status values to report. Thus for example as indicated by the bitmap 809 there is data stored in buffers LCG1, LCG3, LCG4, and LCG 7. If in this example the LCG ID priority ordering is a descending ID value, the selected LCGs to report are LCG1 and LCG3. This is shown in FIG. 8 by the third byte (Oct3) which comprises the LCG1 buffer status value $811_1$ and the fourth byte (Oct4) which comprises the LCG3 buffer status value $811_3$.

In a similar manner to that described with respect to the first set of priority determination embodiments the second set of embodiments also provides the gNB and thus the network with information other than that explicitly reported in the buffer status report values. Thus for example in FIG. 8 it is shown that the logical channel groups LCG1, LCG3, LCG4 and LCG7 all have data buffered but based on the LCG ID based priority only LCGs 1 and 3 are actually reported. However, the gNB is able to determine that there is also data in the LCG4 and LCG7 buffer despite the actual values not being reported.

According to a third set of embodiments a priority of LCGs to be report may be determined based on a hybrid or combination of the first and second set of embodiments. For example the selection of which LCGs to report may be determined based on a priority order determined initially by the first set of embodiments (in other words based on a determined LCG priority order) and then where there are two or more LCGs with the same LCG priority they are further ordered based on the LCG ID value. In other words where the priority between LCGs is equal, then prioritize between equal priority LCGs based on lowest/highest LCG ID.

Figure 9:
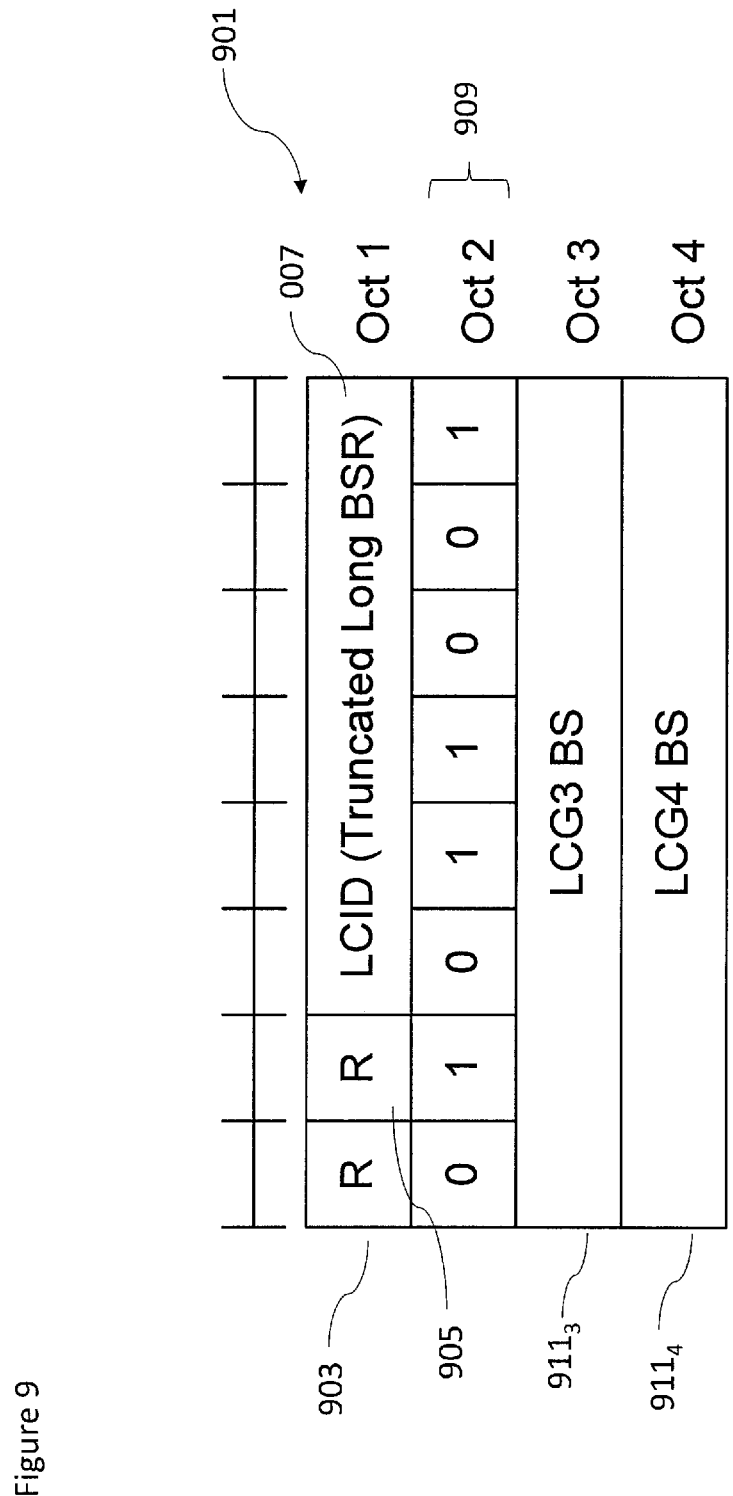

For example FIG. 9 shows an example long truncated buffer status report format according to the priority definition in the second set of embodiments. The long truncated buffer status report 901 is shown with a first byte (Oct1) comprising a pair of reserved bits 903, 905 and the LC ID value 907 identifying the report as a long truncated buffer status report. The long truncated buffer status report 901 is also shown with a second byte (Oct2) which comprises a bitmap (or series of bits) 909 identifying which logical channel groups which have data buffered.

The remaining bytes are used to select, based on initially the LCG priority order and then where there are equal priorities based on the LCG ID order, the number X (where X=2 in FIG. 9) of LCGs buffer status values to report. Thus for example as indicated by the bitmap 909 there is data stored in buffers LCG1, LCG3, LCG4, and LCG7. If in this example the LCG priority order is LCG3, (LCG7, LCG4), LCG1, where LCG4 and LCG7 have an equal LCG priority ordering shown by the parenthesis then the LCD ID order is taken into account and thus the selected LCGs to report are LCG3 and LCG4. This is shown in the example in FIG. 9 by the third byte (Oct3) which comprises the LCG3 buffer status value $911_3$ and the fourth byte (Oct4) which comprises the LCG4 buffer status value $911_4$.

In a similar manner to that described with respect to the first and second set of priority determination embodiments the third set of embodiments also provide the gNB and thus the network with information other than that explicitly reported in the buffer status report values. Thus for example in FIG. 9 it is shown that the logical channel groups LCG1, LCG3, LCG4 and LCG7 all have data buffered but based on the LCG ID based priority only LCGs 3 and 4 are actually reported. However, the gNB is able to determine that there is also data in the LCG1 and LCG7 buffer despite the actual values not being reported.

The above embodiment sets have been shown using the long buffer status report data types being used, where there is a byte comprising indicators of buffer data ordered by LCG ID and then bytes comprising the buffer status values. In some embodiments, a fourth embodiment set, the short BSR type could be used for the buffer status for the LCGs to be reported. In other words the report byte comprises a 3 bit LCG ID field followed by a 5 bit buffer status value.

Figure 10:
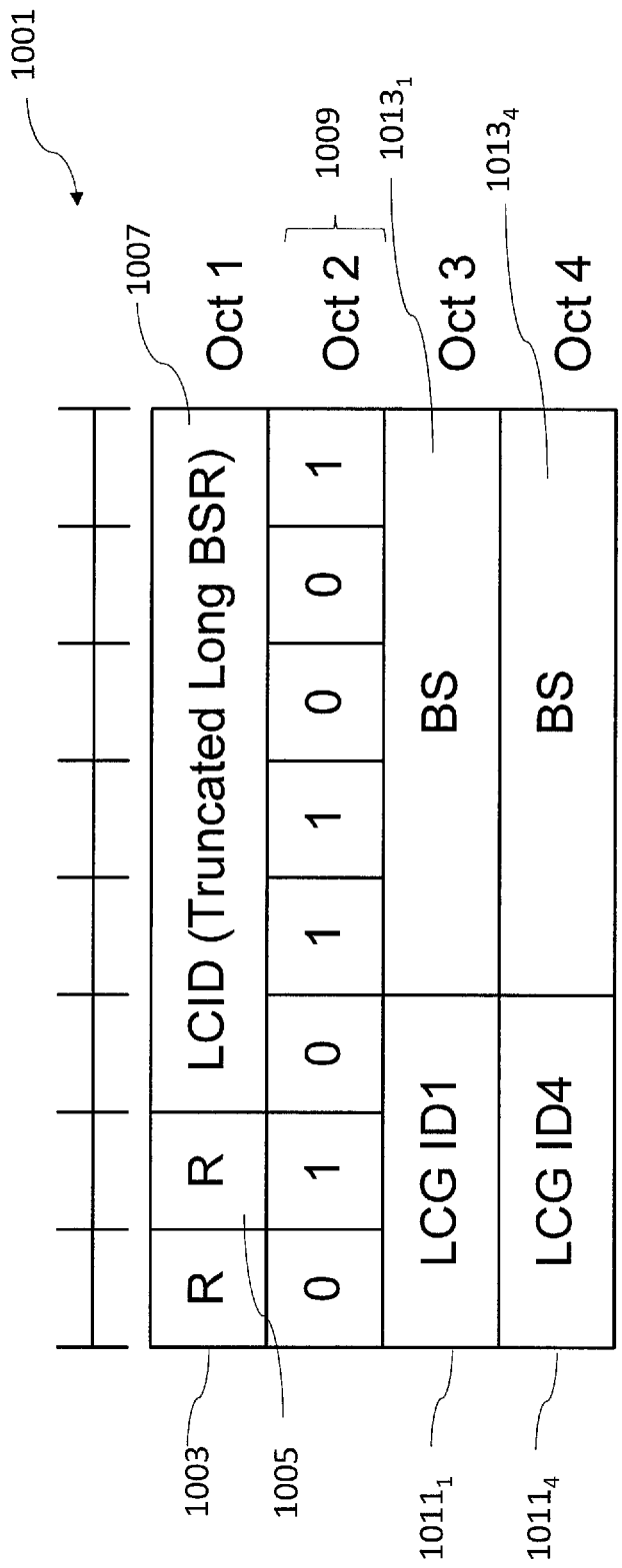

For example FIG. 10 shows an example long truncated buffer status report format according to the priority definition in the second set of embodiments. The long truncated buffer status report 1001 is shown with a first byte (Oct1) comprising a pair of reserved bits 1003, 1005 and the LC ID value 1007 identifying the report as a long truncated buffer status report. The long truncated buffer status report 1001 is also shown with a second byte (Oct2) which comprises a bitmap (series of bits) 1009 identifying which logical channel groups which have data buffered.

The remaining bytes are used to select, based any of the first to third embodiment sets the LCGs buffer status values to report. Thus for example, as indicated by the bitmap 1009 there is data stored in buffers LCG1, LCG3, LCG4, and LCG7, and then the buffers LCG1 and LCG4 are selected to be reported. This is shown in the example in FIG. 10 by the third byte (Oct3) which comprises the short buffer status report type of LCG ID1 value (3 bits) $1011_1$ and LCG1 buffer status value (5 bits) $1013_1$ and the fourth byte (Oct4) which comprises the short buffer status report type of LCG ID4 value $1011_4$ and LCG4 buffer status value $1013_4$.

This also provides the gNB and thus the network with information other than that explicitly reported in the buffer status report values. Thus for example in FIG. 10 it is shown that the logical channel groups LCG1, LCG3, LCG4 and LCG7 all have data buffered but based on the LCG ID based priority only LCGs 1 and 4 are actually reported. However, the gNB is able to determine that there is also data in the LCG3 and LCG7 buffer despite the actual values not being reported.

Furthermore with respect to the fourth set of embodiments the selection of the LCGs to be reported could be done according to the defined LTE procedure. In other words based on the LCG with the highest priority logical channel with data available for transmission. Furthermore, in some embodiments the UE may determine which implementation to choose if the highest priority LCH with data of the LCGs have same priority, or one of the methods above could be applied.

Figure 11:
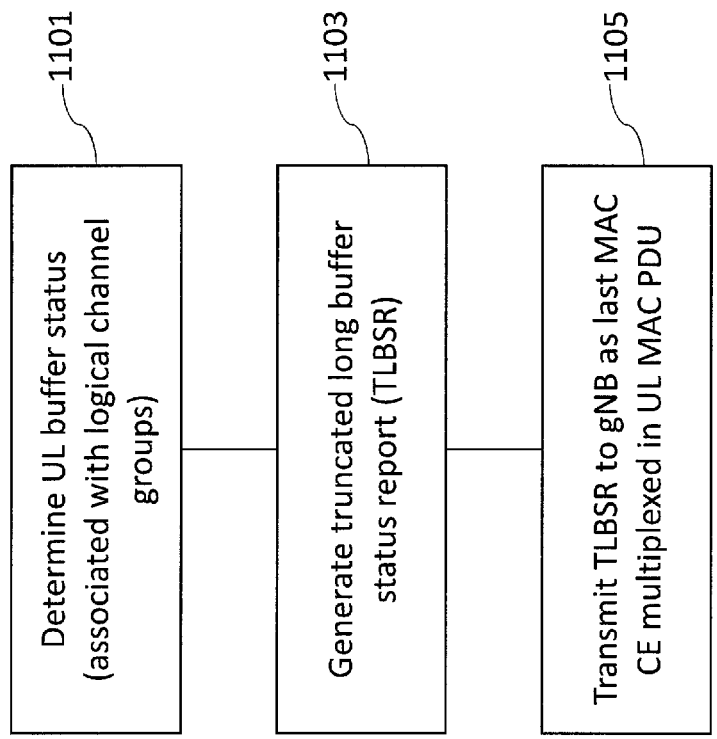
FIG. 11 shows a flow diagram of an overview of the generation/transmission of the new radio long truncated buffer status report according to some embodiments.

With respect to FIG. 11 a flow diagram of an overview of the generation of a new radio long truncated buffer status report according to the embodiments described above is shown.

The user equipment, and in some embodiments the at least one processor, may be configured (or caused) to determine uplink buffer status associated with the logical channel groups.

The operation of determining uplink (UL) buffer status (associated with the logical channel groups) is shown in FIG. 11 by step 1101.

Following the determining of the uplink buffer status and padding bytes left for padding BSR then a long truncated buffer status report is generated wherein a number of the logical channel groups which have data within the uplink buffers are selected and the buffer status values are generated formatted according the chosen format.

The operation of generating the long truncated buffer status report is shown in FIG. 11 by step 1103.

Following the generation of the long truncated buffer status report the long truncated buffer status report is transmitted from the UE to the access point (the gNB) as the last medium access control (MAC) control element (CE) multiplexed in the uplink (UL) medium access control (MAC) packet data unit (PDU). In other words the padding BSR is located as the last subPDU in the MAC PDU.

The operation of transmitting the generated long truncated buffer status report as the last MAC CE multiplexed in the UL MAC PDU is shown in FIG. 11 by step 1105.

Figure 12:
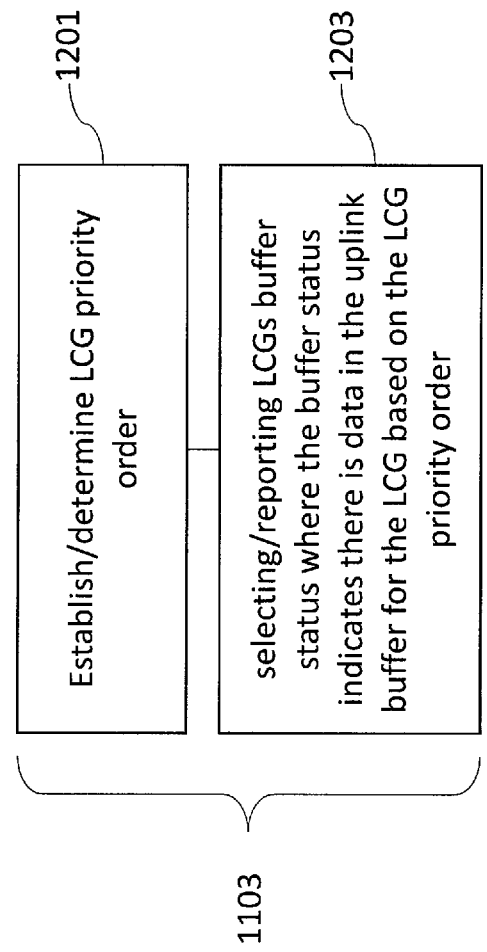
FIGS. 12 to 14 show flow diagrams of the generation of the long truncated buffer status report operation in further detail according to some embodiments.
Figure 13:
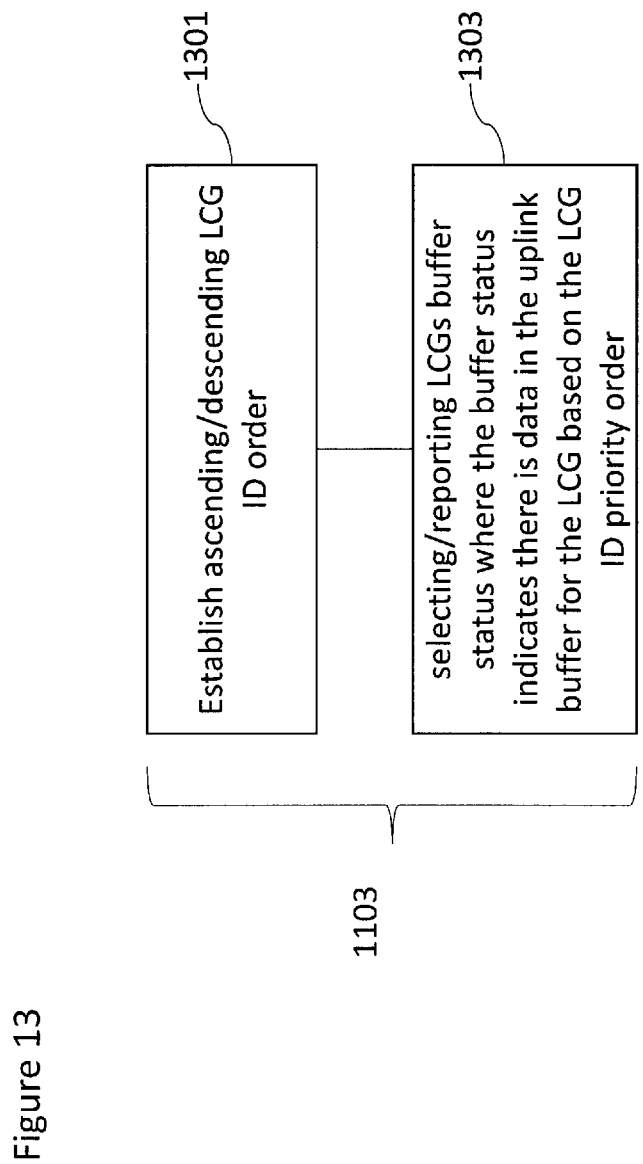
Figure 14:
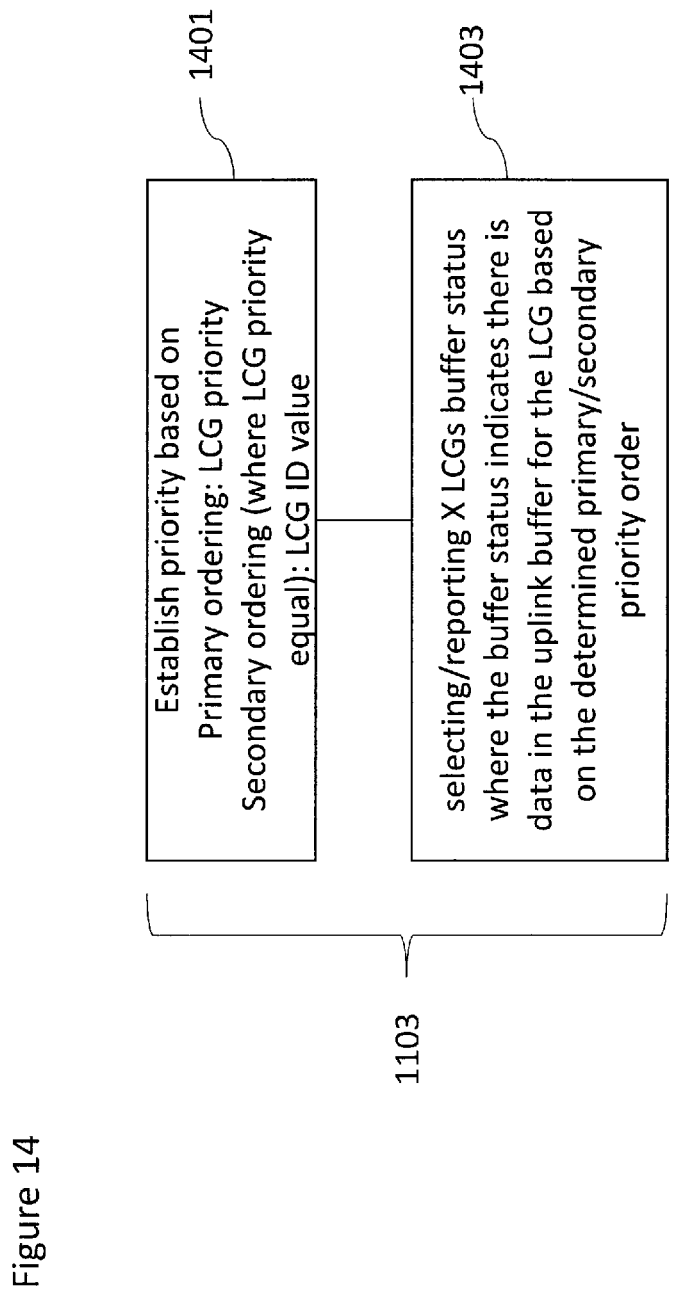

FIGS. 12 to 14 show flow diagrams detailing the generation of the long truncated buffer status report operation based on the first to third embodiment sets described earlier.

Thus for example FIG. 12 shows a flow diagram of the generation of the long truncated buffer status report operation (as shown in FIG. 11 by step 1103) based on the first embodiment set.

The first operation is one of establishing or determining a logical channel group (LCG) priority order. For example the LCG priority order may be one where the priority is based on the highest priority logical channel (LCH) within the logical channel group, or the highest priority logical channel (LCH) having data available for transmission within the logical channel group.

The operation of establishing or determining a logical channel group (LCG) priority order is shown in FIG. 12 by step 1201.

The next operation is one of selecting or reporting the LCGs where the buffer status indicates there is data in the uplink buffer for the LCG based on the logical channel group (LCG) priority order. This may be characterized as a generation of a byte identifying which LCGs have data (as determined by the operation step 1101 in FIG. 11) and generation of bytes of buffer status values associated with the selected LCGs.

The operation of selecting/reporting the LCGs where the buffer status indicates there is data in the uplink buffer for the LCG based on the logical channel group (LCG) priority order is shown in FIG. 12 by step 1203.

FIG. 13 shows a flow diagram of the generation of the long truncated buffer status report operation (as shown in FIG. 11 by step 1103) based on the second embodiment set.

The first operation is one of establishing or determining a logical channel group (LCG) ID priority order. For example the LCG ID priority order may be an ascending or descending one.

The operation of establishing or determining a LCG ID priority order is shown in FIG. 13 by step 1301.

The next operation is one of selecting or reporting the first X LCGs where the buffer status indicates there is data in the uplink buffer for the LCG based on the LCG ID priority order. This may be characterized as a generation of a byte identifying which LCGs have data (as determined by the operation step 1101 in FIG. 11) and generation of bytes of buffer status values associated with the selected LCGs.

The operation of selecting/reporting the first X LCGs where the buffer status indicates there is data in the uplink buffer for the LCG based on the LCG ID priority order is shown in FIG. 13 by step 1303.

FIG. 14 shows a flow diagram of the generation of the long truncated buffer status report operation (as shown in FIG. 11 by step 1103) based on the third embodiment set.

The first operation is one of establishing or determining a selection priority ordering based on primarily a determined logical channel group (LCG) priority order and then secondarily based on a determined logical channel group ID priority order.

The operation of establishing or determining a selection priority ordering based on a primary order defined by the determined LCG priority order and a secondary ordering defined by the determined LCG ID priority order is shown in FIG. 14 by step 1301.

The next operation is one of selecting or reporting the first X LCGs where the buffer status indicates there is data in the uplink buffer for the LCG based on the determined primary and secondary priority orderings. This may be characterized as a generation of a byte identifying which LCGs have data (as determined by the operation step 1101 in FIG. 11) and generation of bytes of buffer status values associated with the selected LCGs.

The operation of selecting/reporting the first X LCGs where the buffer status indicates there is data in the uplink buffer for the LCG based on the determined primary and secondary priority orderings is shown in FIG. 14 by step 1403.

Figure 15:
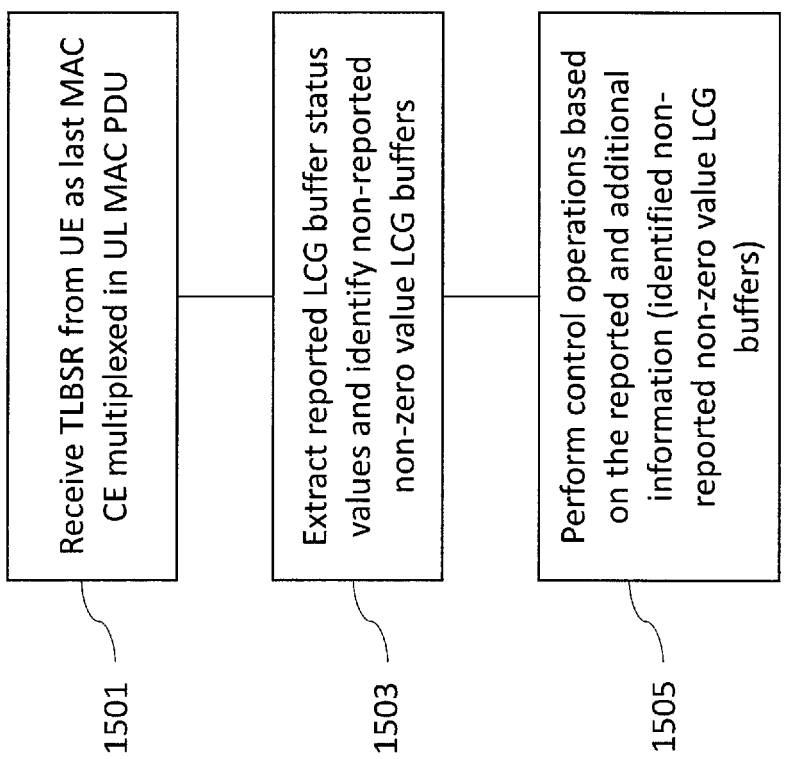
FIG. 15 shows a flow diagram of an overview of the receipt/processing of the new radio long truncated buffer status report according to some embodiments.

FIG. 15 shows the overview of the operation of receiving and processing of the new radio long truncated buffer status report according to the embodiments described above is shown.

The first operation is the receiving at the access point (the gNB) the new radio long truncated buffer status report from the UE as the last medium access control (MAC) control element (CE) multiplexed in the uplink (UL) medium access control (MAC) packet data unit (PDU). In other words the padding BSR is located as the last subPDU in the MAC PDU.

The operation of receiving at the access point (the gNB) the new radio long truncated buffer status report from the UE as the last medium access control (MAC) control element (CE) multiplexed in the uplink (UL) medium access control (MAC) packet data unit (PDU) is shown in FIG. 15 by step 1501.

The next operation is one of extracting from the received buffer status report the buffer status values associated with the LCGs identified from the indication bits and from the determined priority order (for example LCG priority, LCG ID priority or combination of LCG and LCG ID priority). As the element is the last subPDU in the MAC PDU the number of buffer reports is known however from the indication bits it may also be determined other non-reported but non-zero LCG buffer status values.

The operation of extracting reported buffer status values and also non-reported non-zero buffer status information is shown in FIG. 15 by step 1503.

In some embodiments this information may be used by the network controller (for example the gNB) to perform control operations based on this reported and additional information even though the control entity does not know the exact buffer status of the other non-reported LCGs.

For example as described earlier only knowing the logical channel group identifier (LCG ID) having data, a network control entity may be configured to determine a certain UL grant type needs to be provided to the UE so that LCHs data of that LCG will get mapped to a MAC PDU.

The operation of performing control operation based on the reported and additional information is shown in FIG. 15 by step 1505.

In the examples shown above the buffer status report is transmitted and received at the end of the data packet, in other words the last subPDU in the MAC PDU. In doing this the number of buffer reports is known and from the indication bit or bit maps it may also be determined other non-reported but non-zero LCG buffer status values. However in some embodiments a similar result may be achieved by transmitting a buffer status report comprising a report length value indicating the length of the buffer status report or explicitly the number of buffer reports being generated and reported.

As such the above embodiments show that from a set of LCGs, it is possible to identify and signal information about a first sub-set of LCGs for which data is stored in the uplink buffer ready to be transmitted and received. Similarly it is possible to identify and signal buffer status information for a second sub-set of LCGs where the second sub-set is a proper sub-set of the first sub-set of LCG (in other words a set of LCGs which differ from the first sub-set of LCGs by at least of the members of the first sub-set of LCGs).

In some embodiments the second sub-set of LCGs is an empty set. In other words in some embodiments the buffer status report comprises only the information identifying the first sub-set of LCGs, which may be for example a bitmap identifying which LCGs have data available for transmission by the UE and therefore reception by the gNB. Such buffer status reports therefore comprise no information identifying the actual amount of data available for transmission by the UE and therefore reception by the gNB associated with the LCGs.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptions may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
   determining that buffered data associated with a first sub-set of logical channel groups from a set of logical channel groups is available for transmission;
   generating a buffer status report, the buffer status report comprising:
   information identifying from the set of logical channel groups, the first sub-set of logical channel groups, wherein information identifying the first sub-set of logical channel groups comprises a bit map of indication bits identifying logical channel groups associated with buffered data; and
   information identifying an amount of buffered data available for transmission associated with a second sub-set of logical channel groups from the set of logical channel groups,
   wherein the second sub-set of logical channel groups is determined based on a priority, ordering of the set of logical channel groups,
   wherein the second sub-set of logical channel groups differs from the first sub-set of logical channel groups by at least at least one member, and
   wherein the bit map identifies at least one logical channel group associated with a non-reported buffer status value; and
   transmitting the buffer status report.

2. The method as claimed in claim 1, further comprising:
   determining a priority ordering of the set of logical channel groups based on at least one of:
   a determined logical channel group priority order;
   a determined logical channel group priority order based on a highest logical channel priority of a logical channel configured within the logical channel group;

a determined logical channel group priority order based on a highest logical channel priority of a logical channel having data available for transmission within the logical channel group;
a descending logical channel group identification value; an ascending logical channel group identification value; or
a primary order level based on determined logical channel group priority order and a secondary order level based on the logical channel group identification value.

3. The method as claimed in claim 2, wherein generating the buffer status report further comprises selecting logical channel groups from the first sub-set of logical channel groups based on the priority ordering of the set of logical channel groups to form the second sub-set.

4. A method comprising:
receiving a buffer status report, the buffer status report comprising:
information identifying from a set of logical channel groups a first sub-set of logical channel groups, the first sub-set of logical channel groups comprising logical channel groups with buffered data available for reception, wherein information identifying the first sub-set of logical channel groups comprises a bit map of indication bits identifying logical channel groups associated with buffered data;
wherein the information is identifying an amount of buffered data available for reception associated with a second sub-set of logical channel groups from the set of logical channel groups,
wherein the second sub-set of logical channel groups is determined based on a priority ordering of the set of logical channel groups,
wherein the second sub-set of logical channel groups differs from the first sub-set of logical channel groups by at least at least one member, and
wherein the bit map identifies at least one logical channel group associated with a non-reported buffer status value;
extracting for any logical channel groups within the second sub-set of logical channel groups the amount of buffered data available for reception;
identifying at least one further logical channel group which is an element of an intersection the first sub-set of logical elements and a compliment of the second sub-set of logical channel groups for which the non-zero amount of data is available for reception and an amount of buffered data is not indicated in the buffer status report;
performing at least one network control function based on at least one of the extracting or identifying.

5. The method as claimed in claim 4, further comprising determining a priority ordering of the set of logical channel groups based on at least one of:
a determined logical channel group priority order;
a determined logical channel group priority order based on a highest logical channel priority of a logical channel configured within the logical channel group;
a determined logical channel group priority order based on a highest logical channel priority of a logical channel having data available for transmission within the logical channel group;
a descending logical channel group identification value; an ascending logical channel group identification value; or a primary order level based on determined logical channel group priority order and a secondary order level based on the logical channel group identification value.

6. The method as claimed in claim 5, wherein extracting for any logical channel groups within the second sub-set of logical channel groups the amount of buffered data available for reception comprises associating the information identifying the amount of buffered data available for reception to each of the second sub-set of logical channels based on the priority ordering of the set of logical channel groups.

7. An apparatus comprising
at least one processor and
at least one non-transitory memory including a computer program code, the at least one non-transitory memory and the computer program code configured to, with the at least one processor, cause the apparatus at least to:
determine that buffered data associated with a first sub-set of logical channel groups from a set of logical channel groups is available for transmission, wherein information identifying the first sub-set of logical channel groups comprises a bit map of indication bits identifying logical channel groups associated with buffered data;
generate a buffer status report, the buffer status report comprising:
information identifying from the set of logical channel groups, the first sub-set of logical channel groups, and
information identifying an amount of buffered data available for transmission associated with a second sub-set of logical channel groups from the set of logical channel groups,
wherein the second sub-set of logical channel groups is determined based on a priority ordering of the set of logical channel groups,
wherein the second sub-set of logical channel groups differs from the first sub-set of logical channel groups by at least at least one member, and
wherein the bit map identifies at least one logical channel group associated with a non-reported buffer status value; and
transmit the buffer status report.

8. The apparatus as claimed in claim 7, wherein the at least one processor is further caused to determine a priority ordering of the set of logical channel groups based on at least one of:
a determined logical channel group priority order;
a determined logical channel group priority order based on a highest logical channel priority of a logical channel configured within the logical channel group;
a determined logical channel group priority order based on a highest logical channel priority of a logical channel having data available for transmission within the logical channel group;
a descending logical channel group identification value; an ascending logical channel group identification value; or
a primary order level based on determined logical channel group priority order and a secondary order level based on the logical channel group identification value.

9. The apparatus as claimed in claim 8, wherein the at least one processor caused to generate the buffer status report is further caused to select logical channel groups from the first sub-set of logical channel groups based on the priority ordering of the set of logical channel groups to form the second sub-set.

10. The apparatus as claimed in claim 9, wherein the at least one processor caused to select logical channel groups from the first sub-set of logical channel groups based on the priority ordering of the set of logical channel groups to form the second sub-set is further caused to select a determined number of elements from the first sub-set of logical channel groups based on the priority ordering of the set of logical channel groups, wherein the determined number is based on a determined space available to an end of a packet data unit.

11. The apparatus as claimed in claim 10, wherein the at least one processor caused to transmit the buffer status report is further caused to transmit the buffer status report at the end of the packet data unit.

12. The apparatus as claimed in claim 7, wherein the buffer status report comprises a report length value indicating the number of logical channel groups within the second sub-set of logical channel groups.

13. The apparatus as claimed in claim 7, wherein the at least one processor caused to generate a buffer status report is further caused to generate, for the information identifying the first sub-set of logical channel groups from the set of logical channel groups, a byte comprising a bitmap, wherein a value of a bit within the bitmap identifies whether a logical channel group from the set of logical channel groups is within the first sub-set and has buffered data associated with the logical channel group available for transmission.

14. The apparatus as claimed in claim 7, wherein the at least one processor caused to generate a buffer status report is further caused to generate at least one of:
for each logical channel group within the second sub-set of logical channel groups a byte comprising a buffer status value identifying the amount of data available for transmission associated with the logical channel group within the second sub-set of logical channel groups; or
for each logical channel group within the second sub-set of logical channel groups a byte comprising a logical channel group identifier for identifying the logical channel group and a buffer status value identifying the amount of data available for transmission associated with the logical channel group within the second sub-set of logical channel groups.

15. The apparatus as claimed in claim 7, wherein the buffer status report comprises a new radio long truncated buffer status report.

16. An apparatus comprising at least one processor and at least one non-transitory memory including a computer program code, the at least one non-transitory memory and the computer program code configured to, with the at least one processor, cause the apparatus at least to:
receive a buffer status report, the buffer status report comprising: information identifying a first sub-set of logical channel groups from a set of logical channel groups, the first sub-set of logical channel groups comprising logical channel groups with buffered data available for reception, wherein information identifying the first sub-set of logical channel groups comprises a bit map of indication bits identifying logical channel groups associated with buffered data; and
information identifying an amount of buffered data available for reception associated with a second sub-set of logical channel groups from the set of logical channel groups, the second sub-set of logical channel groups differs from the first sub-set of logical channel groups by at least at least one member of the first sub-set of logical channel groups, wherein the second sub-set of logical channel groups is based on a priority ordering of the set of logical channel groups, and
wherein the bit map identifies at least one logical channel group associated with a non-reported buffer status value;
extract for any logical channel groups within the second sub-set of logical channel groups the amount of buffered data available for reception;
identify at least one further logical channel group which is an element of an intersection the first sub-set of logical elements and a compliment of the second sub-set of logical channel groups for which a non-zero amount of data is available for reception and an amount of buffered data is not indicated in the buffer status report;
perform at least one network control function based on at least one of the extracting or identifying.

17. The apparatus as claimed in claim 16, the at least one processor is further caused to determine a priority ordering of the set of logical channel groups based on at least one of:
a determined logical channel group priority order;
a determined logical channel group priority order based on a highest logical channel priority of a logical channel configured within the logical channel group;
a determined logical channel group priority order based on a highest logical channel priority of a logical channel having data available for transmission within the logical channel group;
a descending logical channel group identification value;
an ascending logical channel group identification value; or
a primary order level based on determined logical channel group priority order and a secondary order level based on the logical channel group identification value.

18. The apparatus as claimed in claim 17, wherein the at least one processor caused to extract for any logical channel groups within the second sub-set of logical channel groups the amount of buffered data available for reception is further caused to associate the information identifying the amount of buffered data available for reception to each of the second sub-set of logical channels based on the priority ordering of the set of logical channel groups.

* * * * *